(12) United States Patent
Jung et al.

(10) Patent No.: US 12,267,695 B2
(45) Date of Patent: Apr. 1, 2025

(54) METHOD AND APPARATUS FOR TRANSMITTING UPLINK CHANNEL REPETITIONS

(71) Applicant: Lenovo (Singapore) Pte. Ltd., New Tech Park (SG)

(72) Inventors: Hyejung Jung, Northbrook, IL (US); Ankit Bhamri, Rödermark (DE); Vijay Nangia, Woodridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 332 days.

(21) Appl. No.: 17/794,619

(22) PCT Filed: Jan. 23, 2021

(86) PCT No.: PCT/IB2021/050520
§ 371 (c)(1),
(2) Date: Jul. 22, 2022

(87) PCT Pub. No.: WO2021/149016
PCT Pub. Date: Jul. 29, 2021

(65) Prior Publication Data
US 2023/0046727 A1 Feb. 16, 2023

Related U.S. Application Data

(60) Provisional application No. 62/965,151, filed on Jan. 23, 2020.

(51) Int. Cl.
*H04W 16/28* (2009.01)
*H04L 1/08* (2006.01)
*H04W 72/1268* (2023.01)

(52) U.S. Cl.
CPC .............. *H04W 16/28* (2013.01); *H04L 1/08* (2013.01); *H04W 72/1268* (2013.01)

(58) Field of Classification Search
CPC ...... H04W 72/1268; H04W 16/28; H04L 1/08
(Continued)

(56) References Cited

U.S. PATENT DOCUMENTS

| 2021/0184819 A1* | 6/2021 | Takeda | H04W 24/10 |
| 2022/0166592 A1* | 5/2022 | Matsumura | H04B 7/088 |
| 2022/0376767 A1* | 11/2022 | Nilsson | H04B 7/0862 |

FOREIGN PATENT DOCUMENTS

| EP | 3809602 A1 * | 4/2021 | H04B 7/022 |
| WO | 2019244207 A1 | 12/2019 | |

OTHER PUBLICATIONS

3GPP document R1-1911184 (Year: 2019).*
(Continued)

*Primary Examiner* — Peter G Solinsky
(74) *Attorney, Agent, or Firm* — FIG. 1 Patents

(57) ABSTRACT

A number of repetitions equal to a first number and a number of spatial relations equal to a second number can be determined (210) to transmit an uplink channel with a plurality of uplink channel repetitions and with a plurality of spatial relations. A total number of the plurality of uplink channel repetitions can be the first number of repetitions and a total number of the plurality of spatial relations can be the second number of spatial relations. The plurality of spatial relations for transmission of the plurality of uplink channel repetitions can be determined (220) based on a plurality of quasi-co-location assumptions associated with downlink reception. The plurality of uplink channel repetitions can be transmitted (230) based on the determined plurality of spatial relations.

20 Claims, 4 Drawing Sheets

(58) Field of Classification Search
USPC .......................................................... 370/329
See application file for complete search history.

(56) References Cited

OTHER PUBLICATIONS

Samsung, New WID: Further enhancements on MIMO for NR, RP-193133, 3GPP TSG RAN Meeting #86, Sitges, Spain, Dec. 9-12, 2019.
21702108.8, "Foreign Office Action", EP Application No. 21702108.8, Sep. 3, 2024, 6 pages.
NTT Docomo, Inc, "Enhancements on multi-TRP/panel transmission", 3GPP TSG RAN WG1 #98bis, R1-1911184, Chongqing, China [retrieved Aug. 23, 2022]. Retrieved from the internet <https://www.3gpp.org/ftp/tsg_ran/WG1_RL1/TSGR1_98b/Docs>., Oct. 2019, 32 Pages.
PCT/IB2021/050520, "International Search Report and Written Opinion", PCT Application No. PCT/IB2021/050520, Jul. 29, 2021, 11 pages.
ZTE, "Enhancements on Multi-TRP and Multi-panel Transmission", 3GPP TSG RAN WG1 #99, R1-1911930, Reno, USA, Nov. 2019, 14 pages.

* cited by examiner

METHOD AND APPARATUS FOR TRANSMITTING UPLINK CHANNEL REPETITIONS

BACKGROUND

1. Field

The present disclosure is directed to communicating on a wireless wide area network.

2. Introduction

Presently, wireless communication devices, such as UE, communicate with other communication devices using wireless signals. In URLLC, repeated UL transmissions with different UL beams can achieve the required reliability and overcome channel blockage. A UE should be able to determine UL beams based on a low latency and low signaling overhead procedure. If a UE operates with narrow beams of high beamforming gains, the UE may have to choose an UL beam different from an optimal DL beam due to MPE limitation in UL transmissions. Efficient UL beam management procedure taking into account MPE related maximum transmit power reduction needs to be developed.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for communicating on a wireless network. At least some embodiments can provide a method and apparatus for transmitting uplink channel repetitions. At least some embodiments can provide a method and apparatus for reporting an indication of downlink reference signals. At least some embodiments can provide efficient UL beam management procedure taking into account MPE related maximum transmit power reduction.

According to a possible embodiment, a number of repetitions equal to a first number, K, and a number of spatial relations equal to a second number, N, can be determined to transmit an uplink channel with a plurality of uplink channel repetitions and with a plurality of spatial relations. A total number of the plurality of uplink channel repetitions can be the first number, K, of repetitions and a total number of the plurality of spatial relations can be the second number, N, of spatial relations. The plurality of spatial relations for transmission of the plurality of uplink channel repetitions can be determined based on a plurality of quasi-co-location assumptions associated with downlink reception. The plurality of uplink channel repetitions can be transmitted based on the determined plurality of spatial relations.

According to a possible embodiment, configuration information of DL RS measurements and reporting can be received. The configuration information can configure the UE to report a DL RS for DL reception and a DL RS for UL transmission, respectively, and the configuration information can include information of a plurality of DL RS. The plurality of DL RSs can be measured. A first DL RS can be selected for DL receptions and a second DL RS can be selected for UL transmissions based on measurements of the plurality of DL RSs. An indication of the first and second DL RSs can be reported.

Figure 1:
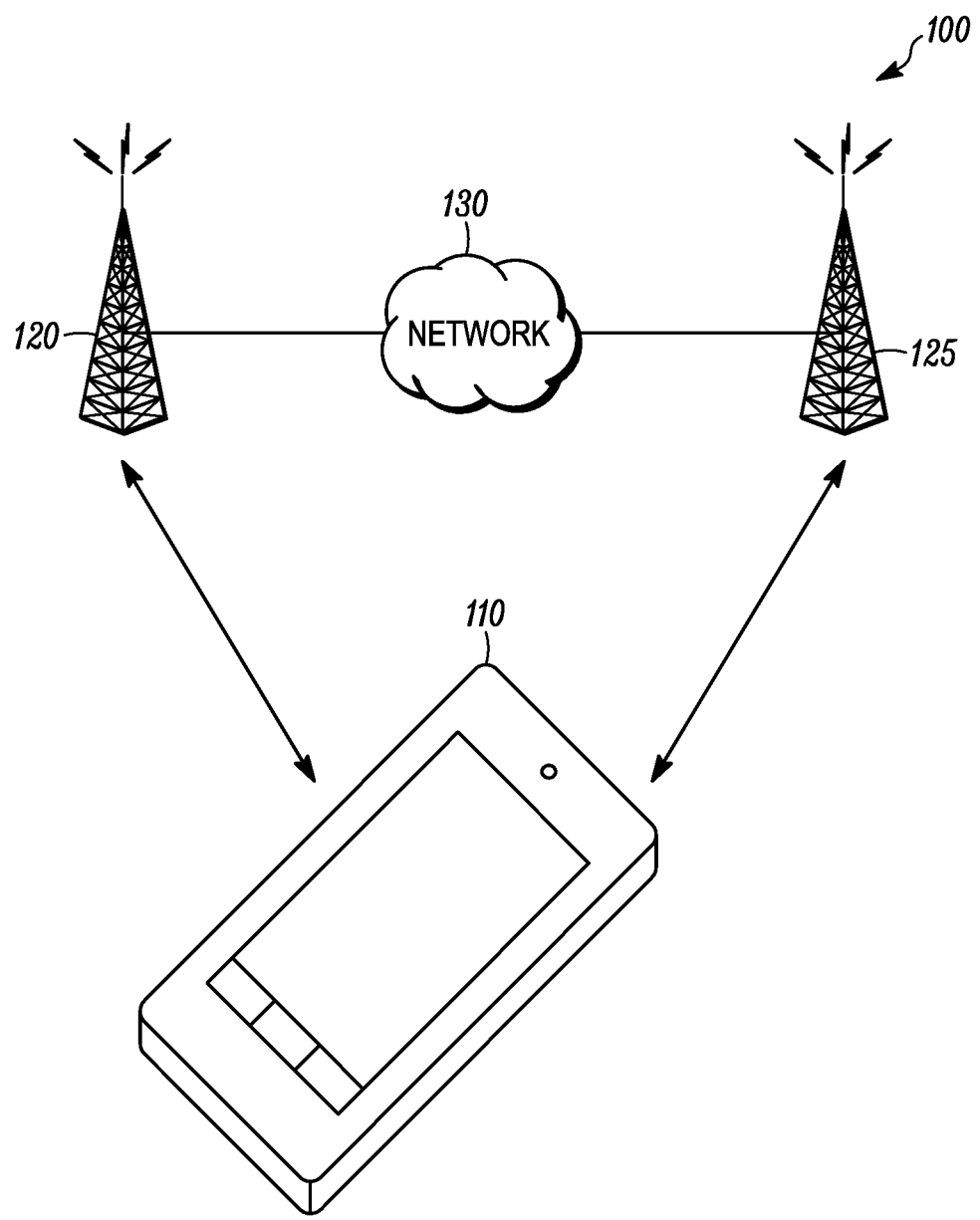
FIG. 1 is an example block diagram of a system according to a possible embodiment.

FIG. 1 is an example block diagram of a system 100 according to a possible embodiment. The system 100 can include a UE 110, at least one network entity 120 and 125, and a network 130. The UE 110 can be a wireless wide area network device, a user device, a wireless terminal, a portable wireless communication device, a smartphone, a cellular telephone, a flip phone, a personal digital assistant, a smartwatch, a personal computer, a tablet computer, a laptop computer, a selective call receiver, an IoT device, or any other user device that is capable of sending and receiving communication signals on a wireless network. The at least one network entity 120 and 125 can be a wireless wide area network base station, can be a NodeB, can be an eNB, can be a gNB, such as a 5G NodeB, can be an unlicensed network base station, can be an access point, can be a base station controller, can be a network controller, can be a TRP, can be a different type of network entity from the other network entity, and/or can be any other network entity that can provide wireless access between a UE and a network.

The network 130 can include any type of network that is capable of sending and receiving wireless communication signals. For example, the network 130 can include a wireless communication network, a cellular telephone network, a TDMA-based network, a CDMA-based network, an OFDMA-based network, an LTE network, a NR network, a 3GPP-based network, a 5G network, a satellite communications network, a high-altitude platform network, the Internet, and/or other communications networks.

In operation, the UE 110 can communicate with the network 130 via at least one network entity 120. For example, the UE 110 can send and receive control signals on a control channel and user data signals on a data channel.

In RAN #84 meeting, a new Rel-17 NR Work Item "New WID: Further enhancements on MIMO for NR" (RP-193133) was approved. The Work Item includes the detailed objectives to extend specification support in the following areas [RAN1].

A first area can be enhancement on multi-beam operation, mainly targeting frequency range 2 (FR2, e.g. 24250 MHz-52600 MHz according to 3GPP TS 38.101) while also applicable to frequency range 1 (FR1, 410 MHz-7125 MHz according to 3GPP TS 38.101). This area can include identifying and specifying features to facilitate more efficient (lower latency and overhead) DL/UL beam management to support higher intra- and Layer 1 (L1)/Layer 2 (L2)-centric inter-cell mobility and/or a larger number of configured TCI states. One feature can be common beam for data and control transmission/reception for DL and UL, especially for intra-band CA. Another feature can be unified TCI framework for DL and UL beam indication. Another feature can be enhancement on signaling mechanisms for the above features to improve latency and efficiency with more usage of dynamic control signaling (as opposed to RRC).

This area can also include identifying and specifying features to facilitate UL beam selection for UEs equipped with multiple panels, considering UL coverage loss mitigation due to MPE, based on UL beam indication with the unified TCI framework for UL fast panel selection.

A second area can be enhancement on the support for multi-TRP deployment, targeting both FR1 and FR2. This area can include identifying and specifying features to improve reliability and robustness for channels other than PDSCH (that is, PDCCH, PUSCH, and PUCCH) using multi-TRP and/or multi-panel, with Rel.16 reliability features as the baseline. This area can also include identifying and specifying QCL/TCI-related enhancements to enable inter-cell multi-TRP operations, assuming multi-DCI based multi-PDSCH reception. This area can also include evaluating and, if needed, specifying beam-management-related enhancements for simultaneous multi-TRP transmission with multi-panel reception. This area can also include enhancement to support HST-SFN deployment scenario, such as identifying and specifying solution(s) on QCL assumption for DMRS, e.g., multiple QCL assumptions for the same DMRS port(s), targeting DL-only transmission; and evaluating and, if the benefit over Rel.16 HST enhancement baseline is demonstrated, specifying QCL/QCL-like relation (including applicable type(s) and the associated requirement) between DL and UL signal by reusing the unified TCI framework.

A third area can be enhancement on SRS, targeting both FR1 and FR2. This area can include identifying and specifying enhancements on aperiodic SRS triggering to facilitate more flexible triggering and/or DCI overhead/usage reduction. This area can also include specifying SRS switching for up to 8 antennas (e.g., xTyR, x={1, 2, 4} and y={6, 8}). This area can also include evaluating and, if needed, specifying the following mechanism(s) to enhance SRS capacity and/or coverage: SRS time bundling, increased SRS repetition, partial sounding across frequency.

A fourth area can be enhancement on CSI measurement and reporting. This area can include evaluating and, if needed, specifying CSI reporting for DL multi-TRP and/or multi-panel transmission to enable more dynamic channel/interference hypotheses for NCJT, targeting both FR1 and FR2. This area can also include evaluating and, if needed, specifying Type II port selection codebook enhancement (based on Rel.15/16 Type II port selection) where information related to angle(s) and delay(s) are estimated at the gNB based on SRS by utilizing DL/UL reciprocity of angle and delay, and the remaining DL CSI is reported by the UE, mainly targeting FDD FR1 to achieve better trade-off among UE complexity, performance and reporting overhead.

Other objectives of the Work Item include investigating if the requirements on link recovery procedure is suitable for FR2 serving cells [RAN4], specifying higher layer support of enhancements listed above [RAN2], and specifying core requirements associated with the items specified by RAN1 [RAN4].

In high frequency bands (e.g. frequency bands above 6 GHz), operating with a large number of narrow beams at a network entity and additionally at a UE may be needed for provisioning a proper coverage. As a result, frequent beam changes across the large number of narrow beams are expected, and efficient DL/UL beam management is critical to efficient system operation. In URLLC, repeated UL transmissions with different UL beams may be beneficial to achieve the required reliability (e.g. $10^{-6}$ Block Error Rate) and avoid the packet loss due to channel blockage.

If a UE operates with narrow beams and is equipped with one or more antenna panels, for some cases, the UE may have to choose an UL beam different from an optimal DL beam due to MPE limitation in UL transmissions. For example, a first UL beam generated by applying a spatial filter the same as one used for receiving the optimal DL beam may require maximum output power reduction due to the MPE limitation (e.g. the first UL beam pointing towards a human directly). If the UE is operated with the maximum allowed transmit power (i.e. UE is in an UL power limited condition), the maximum output power reduction would lead to UL coverage loss. Thus, the UE may have to choose a second UL beam that provides the better UL coverage than the first UL beam taking into account the maximum allowed transmit power and pathloss.

At least some embodiments can provide enhanced uplink beam management. At least some embodiments can also provide enhanced uplink beam management to handle MPE issues. At least some embodiments can provide methods to determine default UL beams for PUSCH/PUCCH repetition and methods to simultaneously report UL and DL beams and enable fast UL beam adaptation.

For UL beams for PUSCH transmission, according to 3GPP TS 38.214, two transmission schemes, codebook-based transmission and non-codebook-based transmission, are supported for PUSCH. For PUSCH transmission(s) dynamically scheduled by an UL grant in a DCI, a UE shall, upon detection of a PDCCH with a configured DCI format 0_0 or 0_1, transmit the corresponding PUSCH as indicated by that DCI.

For PUSCH scheduled by DCI format 0_0 on a cell, the UE shall transmit PUSCH according to the spatial relation, if applicable, corresponding to the PUCCH resource with the lowest ID within the active UL BWP of the cell, and the PUSCH transmission is based on a single antenna port. A spatial setting for a PUCCH transmission is provided by higher layer parameter PUCCH-SpatialRelationInfo if the UE is configured with a single value for higher layer parameter pucch-SpatialRelationInfoId; otherwise, if the UE is provided multiple values for higher layer parameter PUCCH-SpatialRelationInfo, the UE determines a spatial setting for the PUCCH transmission based on a received PUCCH spatial relation activation/deactivation MAC CE as described in [3GPP TS 38.321]. The UE applies a corresponding setting for a spatial domain filter to transmit PUCCH 3 msec after the slot where the UE transmits HARQ-ACK information with ACK value corresponding to a PDSCH reception providing the PUCCH-SpatialRelationInfo.

For codebook-based transmission, PUSCH can be scheduled by DCI format 0_0 or DCI format 0_1. If PUSCH is scheduled by DCI format 0_1, then the UE determines its PUSCH transmission precoder based on SRI, TPMI, and the transmission rank from the DCI, given by DCI fields of SRS resource indicator and precoding information and number of layers in subclause 7.3.1.1.2 of [3GPP TS 38.212]. The TPMI is used to indicate the precoder to be applied over the antenna ports {0 . . . v−1} and that corresponds to the SRS resource selected by the SRI (unless a single SRS resource is configured for a single SRS-ResourceSet set to 'codebook'). The transmission precoder is selected from the uplink codebook that has a number of antenna ports equal to higher layer parameter nrofSRS-Ports in SRS-Config, as defined in Subclause 6.3.1.5 of [3GPP TS 38.211]. When the UE is configured with the higher layer parameter txConfig set to 'codebook', the UE is configured with at least one SRS resource. The indicated SRI in slot n is associated with the most recent transmission of SRS resource identified by the SRI, where the SRS resource is prior to the PDCCH carrying the SRI before slot n. The UE determines its codebook subsets based on TPMI and upon the reception of higher layer parameter codebookSubset in PUSCH-Config, which may be configured with 'fullyAndPartialAndNonCoherent', or 'partialAndNonCoherent', or 'nonCoherent' depending on the UE capability. The maximum transmission rank may be configured by the higher parameter maxRank in PUSCH-Config.

For non-codebook-based transmission, PUSCH can be scheduled by DCI format 0_0 or DCI format 0_1. The UE can determine its PUSCH precoder and transmission rank based on the wideband SRI when multiple SRS resources are configured in an SRS resource set with higher layer parameter usage in SRS-ResourceSet set to 'nonCodebook', where the SRI is given by the SRS resource indicator in DCI format 0_1 according to subclause 7.3.1.1.2 of [3GPP TS 38.212] and only one SRS port is configured for each SRS resource. The indicated SRI in slot n is associated with the most recent transmission of SRS resource(s) identified by the SRI, where the SRS transmission is prior to the PDCCH carrying the SRI before slot n.

The UE shall perform one-to-one mapping from the indicated SRI(s) to the indicated DMRS ports(s) given by DCI format 0_1 in increasing order.

In Rel-16 3GPP NR, for PUSCH scheduled by DCI format 0_0 on a cell and if the higher layer parameter enableDefaultBeamPlForPUSCH0_0 is set 'enabled', the UE is not configured with PUCCH resources on the active UL BWP and the UE is in RRC connected mode, the UE shall transmit PUSCH according to the spatial relation, if applicable, with a reference to the RS with 'QCL-Type-D' corresponding to the QCL assumption of the CORESET with the lowest ID. For PUSCH scheduled by DCI format 0_0 on a cell and if the higher layer parameter enableDefaultBeamPlForPUSCH0_0 is set 'enabled', the UE is configured with PUCCH resources on the active UL BWP where all the PUCCH resource(s) are not configured with any spatial relation and the UE is in RRC connected mode, the UE shall transmit PUSCH according to the spatial relation, if applicable, with a reference to the RS with 'QCL-Type-D' corresponding to the QCL assumption of the CORESET with the lowest ID in case CORESET(s) are configured on the CC.

For UL beams for SRS transmissions, according to 3GPP Rel-16 TS 38.214, Rel-16 NR supports a MAC CE based spatial relation update for aperiodic SRS per resource level and a default UL beam for an SRS resource for latency and overhead reduction in UL beam management.

According to R1-1913655 (CR for TS 38.214: Introduction of NR enhanced), 6.2.1, UE sounding procedure, when a UE receives an spatial relation update command, as described in subclause 6.1.3.xx of [10, TS 38.321], for an SRS resource, and when the HARQ-ACK corresponding to the PDSCH carrying the update command is transmitted in slot n, the corresponding actions in [10, TS 38.321] and the UE assumptions on updating spatial relation for the SRS resource shall be applied for SRS transmission starting from the first slot that is after slot $n+3N_{slot}^{subframe,\mu}$. [The update command contains spatial relation assumptions provided by a list of references to reference signal IDs, one per element of the updated SRS resource set. Each ID in the list refers to a reference SS/PBCH block, NZP CSI-RS resource configured on serving cell indicated by Resource Serving Cell ID field in the update command if present, same serving cell as the SRS resource set otherwise, or SRS resource configured on serving cell and uplink bandwidth part indicated by Resource Serving Cell ID field and Resource BWP ID field in the update command if present, same serving cell and bandwidth part as the SRS resource set otherwise.] When the UE is configured with the higher layer parameter usage in SRS-ResourceSet set to 'antennaSwitching', the UE shall not expect to be configured with different spatial relations for SRS resources in the same SRS resource set.

When a spatialRelationInfo is activated/updated for a semi-persistent or aperiodic SRS resource by a MAC CE for a set of CCs/BWPs, where the applicable list of CCs is indicated by higher layer parameter [applicableCellList], the spatialRelationInfo is applied for the semi-persistent or aperiodic SRS resource(s) with the same SRS resource ID for all the BWPs in the indicated CCs.

When the higher layer parameter enableDefaultBeamPlForSRS is set 'enabled', and if the higher layer parameter spatialRelationInfo for the SRS resource, except for the SRS resource with the higher layer parameter usage in SRS-ResourceSet set to 'beamManagement' or for the SRS resource with the higher layer parameter usage in SRS-ResourceSet set to 'nonCodebook' with configuration of associatedCSI-RS, is not configured in FR2 and if the UE is not configured with higher layer parameter(s) pathlossReferenceRS, the UE shall transmit the target SRS resource with the same spatial domain transmission filter used for the reception of the CORESET with the lowest controlResourceSetId in the active DL BWP in the CC; or with the same spatial domain transmission filter used for the reception of the activated TCI state with the lowest ID applicable to PDSCH in the active DL BWP of the CC if the UE is not configured with any CORESET in the CC.

For PUSCH repetition schemes in Rel-16 NR, from TS 38.214 CR R1-1913650, for PUSCH repetition Type A, when transmitting PUSCH scheduled by DCI format 0_1 or 0_2 in PDCCH with CRC scrambled with C-RNTI, MCS-C-RNTI, or CS-RNTI with NDI=1, the number of repetitions K is determined as if numberofrepetitions is present in the resource allocation table, the number of repetitions K is equal to numberofrepetitions; else if the UE is configured with pusch-AggregationFactor, the number of repetitions K is equal to pusch-AggregationFactor; otherwise, K=1.

For PUSCH repetition Type A, in case K>1, the same symbol allocation is applied across the K consecutive slots and the PUSCH is limited to a single transmission layer. The UE shall repeat the TB across the K consecutive slots applying the same symbol allocation in each slot. The redundancy version to be applied on the nth transmission occasion of the TB, where n=0, 1, ... K−1, is determined according to table 6.1.2.1-2.

TABLE 6.1.2.1-2:

| | Redundancy version for PUSCH transmission | | | |
|---|---|---|---|---|
| $rv_{id}$ indicated by the DCI scheduling the PUSCH | $rv_{id}$ to be applied to $n^{th}$ transmission occasion (repetition Type A) or $n^{th}$ actual repetition (repetition Type B) | | | |
| | n mod 4 = 0 | n mod 4=1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

For PUSCH repetition Type A, a PUSCH transmission in a slot of a multi-slot PUSCH transmission is omitted according to the conditions in Subclause 11.1 of [6, TS38.213].

For PUSCH repetition Type B, the number of nominal repetitions is given by numberofrepetitions. For the n-th nominal repetition, n=0, . . . , numberofrepetitions−1, the slot where the nominal repetition starts is given by $$K_s + \left\lfloor \frac{S + n \cdot L}{N_{symb}^{slot}} \right\rfloor,$$

and the starting symbol relative to the start of the slot is given by mod(S+n·L, $N_{symb}^{slot}$); and the slot where the nominal repetition ends is given by $$K_s + \left\lfloor \frac{S + (n+1) \cdot L - 1}{N_{symb}^{slot}} \right\rfloor,$$

and the ending symbol relative to the start of the slot is given by mod(S+(n+1)·L−1, $N_{symb}^{slot}$.

Here $K_s$ is the slot where the PUSCH transmission starts, and $N_{symb}^{slot}$ is the number of symbols per slot as defined in Subclause 4.3.2 of [4, TS38.211].

For PUSCH repetition Type B, the UE determines invalid symbol(s) for PUSCH repetition Type B transmission as follows: A symbol that is indicated as downlink by tdd-UL-DL-ConfigurationCommon or tdd-UL-DL-Configuration-Dedicated is considered as an invalid symbol for PUSCH repetition Type B transmission.

If a UE is configured with higher layer parameter SlotFormatInficator, the UE may be configured with the higher layer parameter InvalidSymbolPattern, which provides a symbol level bitmap spanning one or two slots (higher layer parameter symbols given by InvalidSymbolPattern). A bit value equal to 1 in the symbol level bitmap symbols indicates that the corresponding symbol is an invalid symbol for PUSCH repetition Type B transmission. The UE may be additionally configured with a time-domain pattern (higher layer parameter periodicityAndPattern given by InvalidSymbolPattern), where each bit of periodicityAndPattern corresponds to a unit equal to a duration of the symbol level bitmap symbols, and a bit value equal to 1 indicates that the symbol level bitmap symbols is present in the unit. The periodicityAndPattern can be {1, 2, 4, 5, 8, 10, 20 or 40} units long, but maximum of 40 ms. The first symbol of periodicityAndPattern every 40 ms/P periods is a first symbol in frame nf mod 4=0, where P is the duration of periodicityAndPattern in units of ms. When periodicityAndPattern is not configured, for a symbol level bitmap spanning two slots, the bits of the first and second slots correspond respectively to even and odd slots of a radio frame, and for a symbol level bitmap spanning one slot, the bits of the slot correspond to every slot of a radio frame.

If InvalidSymbolPattern is configured, when the UE applies the invalid symbol pattern is determined as follows: if InvalidSymbolPatternIndicator-ForDCIFormat0_1 is configured when the PUSCH is scheduled by DCI format 0_1, or if InvalidSymbolPatternIndicator-ForDCIFormat0_2 is configured when the PUSCH is scheduled by DCI format 0_2, if invalid symbol pattern indicator field is set 1, the UE applies the invalid symbol pattern; otherwise, the UE does not apply the invalid symbol pattern. Otherwise, the UE applies the invalid symbol pattern.

For PUSCH repetition Type B, after determining the invalid symbol(s) for PUSCH repetition type B transmission for each of the K nominal repetitions, the remaining symbols are considered as potentially valid symbols for PUSCH repetition Type B transmission. If the number of potentially valid symbols for PUSCH repetition type B transmission is greater than zero for a nominal repetition, the nominal repetition consists of one or more actual repetitions, where each actual repetition consists of a consecutive set of potentially valid symbols that can be used for PUSCH repetition Type B transmission within a slot. An actual repetition is omitted according to the conditions in Subclause 11.1 of [6, TS38.213]. The redundancy version to be applied on the nth actual repetition (with the counting including the actual repetitions that are omitted) is determined according to table 6.1.2.1-2.

For L1-RSRP reporting, from TS 38.214 CR R1-1913655, 5.2.1.4.2, Report Quantity Configurations, if the UE is configured with a CSI-ReportConfig with the higher layer parameter reportQuantity set to 'cri-RSRP' or 'ssb-Index-RSRP', if the UE is configured with the higher layer parameter groupBasedBeamReporting set to 'disabled', the UE is not required to update measurements for more than 64 CSI-RS and/or SSB resources, and the UE shall report in a single report nrofReportedRS (higher layer configured) different CRI or SSBRI for each report setting. If the UE is configured with the higher layer parameter groupBasedBeamReporting set to 'enabled', the UE is not required to update measurements for more than 64 CSI-RS and/or SSB resources, and the UE shall report in a single reporting instance two different CRI or SSBRI for each report setting, where CSI-RS and/or SSB resources can be received simultaneously by the UE either with a single spatial domain receive filter, or with multiple simultaneous spatial domain receive filters.

From 5.2.1.4.3, L1-RSRP Reporting, for L1-RSRP computation, the UE may be configured with CSI-RS resources, SS/PBCH Block resources, or both CSI-RS and SS/PBCH block resources, when resource-wise quasi co-located with 'QCL-Type C' and 'QCL-TypeD' when applicable. The UE may be configured with CSI-RS resource setting up to 16 CSI-RS resource sets having up to 64 resources within each set. The total number of different CSI-RS resources over all resource sets is no more than 128.

For L1-RSRP reporting, if the higher layer parameter nrofReportedRS in CSI-ReportConfig is configured to be one, the reported L1-RSRP value is defined by a 7-bit value in the range [−140, −44] dBm with 1 dB step size, if the higher layer parameter nrofReportedRS is configured to be larger than one, or if the higher layer parameter groupBasedBeamReporting is configured as 'enabled', the UE shall use differential L1-RSRP based reporting, where the largest measured value of L1-RSRP is quantized to a 7-bit value in the range [−140, −44] dBm with 1 dB step size, and the differential L1-RSRP is quantized to a 4-bit value. The differential L1-RSRP value is computed with 2 dB step size with a reference to the largest measured L1-RSRP value which is part of the same L1-RSRP reporting instance. The mapping between the reported L1-RSRP value and the measured quantity is described in [11, TS 38.133].

For MPE enhancements, RAN4 has discussed Rel-16 frequency range 2 (FR2) MPE enhancements to mitigate RLF due to sudden and unpredictable large back off caused by UE's actions to ensure compliance with exposure regulation. For example, R4-1913576 proposed enhancing PHR MAC CE with inclusion of relevant information on the UE UL duty cycle preference and P-MPR. However, these methods for Rel-16 NR may limit the UL duty cycle, which is not suitable for UL-heavy applications. In addition, event-trigger based enhanced PHR MAC CE transmission does not prevent from the beginning a gNB from assigning a problematic UL beam for UE's UL transmissions.

At least some embodiments that enable a UE to use a common set of beams for DL and UL communications, i.e. to employ spatial filters used for DL receptions (e.g. PDSCH and PDCCH) as spatial filters for UL transmissions (e.g. PUSCH and PUCCH), can reduce latency and overhead involved with UL beam management and indication, compared to SRS-based UL beam management. The SRS based UL beam management and indication may lead to signaling overhead and latency related to SRS resource configuration, SRS triggering, and UL beam indication, radio resource overhead for SRS resources, and UE power consumption for SRS transmissions.

A possible embodiment can provide default UL Beams for PUSCH/PUCCH repetition. This embodiment proposes methods to determine more than one UL beam for PUSCH/PUCCH repetitions based on more than one DL beam used for PDCCH or PDSCH receptions on a scheduled cell or more than one DL beam used for PDCCH receptions on a scheduling cell. The proposed methods can allow fast UL beam adaptation with low overhead for URLLC communications.

In one embodiment, if a UE is indicated to use a default UL beam(s) and transmits 'K' PUSCH repetitions with 'N' different UL beams, the UE determines a set of 'N' default UL beams for 'K' PUSCH repetitions based on 'N' QCL assumptions of 'N' CORESETs with the 'N' lowest CORESET IDs on an active DL BWP of a scheduled cell. That is, the UE performs a PUSCH transmission of 'K' PUSCH repetitions according to a spatial relation with a reference to an RS with 'QCL-Type-D' corresponding to a QCL assumption of a CORESET of the 'N' CORESETs with the 'N' lowest CORESET IDs on the active DL BWP of the scheduled cell.

In one implementation, with each of the first K mod(N) UL beams (mod is a modulo operator), the UE performs $\lceil K/N \rceil$ consecutive actual repetitions (for PUSCH repetition Type B in TS 38.214) or transmits PUSCH on $\lceil K/N \rceil$ consecutive transmission occasions (for PUSCH repetition Type A in TS 38.214), where $\lceil X \rceil$ rounds X to the nearest integer no less than X. For each of the remaining (N−K mod(N)) UL beams, the UE performs $\lfloor K/N \rfloor$ consecutive actual repetitions or transmits PUSCH on $\lfloor K/N \rfloor$ consecutive transmission occasions, where $\lfloor X \rfloor$ rounds X to the nearest integer no larger than X. In one example, the order of the default UL beams applied is based on the ascending order of the corresponding 'N' lowest CORESET IDs.

In an alternate implementation, for actual repetition or transmission occasion i, i=0, 1, ... K−1, the UE uses UL default beam n, n=0, 1, ... N−1 where $$n = \left\lfloor \frac{i}{\lceil K/N \rceil} \right\rfloor.$$

In another example, consecutive actual repetition or transmission occasion use different UL beams, for example, the UE uses UL default beam n, n=0, 1, ... N−1 where n=i mod N.

In one example, for PUSCH scheduled by DCI format 0_0 on a cell and if the higher layer parameter enableDefaultBeamPlForPUSCH0_0 is set 'enabled', the UE is configured with pusch-AggregationFactor, the UE is not configured with PUCCH resources on the active UL BWP, and the UE is in RRC connected mode, then the UE shall transmit 'K' PUSCH repetitions, each repetition according to a spatial relation, if applicable, with a reference to an RS with 'QCL-Type-D' corresponding to a QCL assumption of a CORESET of the 'N' CORESETs with the 'N' lowest CORESET IDs on the active DL BWP of the CC.

In another example, for PUSCH scheduled by DCI format 0_0 on a cell and if the higher layer parameter enableDefaultBeamPlForPUSCH0_0 is set 'enabled', the UE is configured with pusch-AggregationFactor, the UE is configured with PUCCH resources on the active UL BWP where all the PUCCH resource(s) are not configured with any spatial relation and the UE is in RRC connected mode, then the UE shall transmit 'K' PUSCH repetitions, each repetition according to the spatial relation, if applicable, with a reference to an RS with 'QCL-Type-D' corresponding to a QCL assumption of a CORESET of the 'N' CORESETs with the 'N' lowest CORESET IDs in case CORESET(s) are configured on the CC.

In another embodiment, if a UE is indicated to use a default UL beam(s) and transmits 'K' PUSCH repetitions with 'N' different UL beams, and if CORESETs and/or search spaces are not configured for an active DL BWP of a scheduled cell, the UE determines a set of 'N' default UL beams for 'K' PUSCH repetitions based on 'N' QCL assumptions of 'N' activated TCI states with the 'N' lowest TCI state IDs applicable to PDSCH on an active DL BWP of a scheduled cell. That is, the UE performs a PUSCH transmission of 'K' PUSCH repetitions according to a set of 'N' spatial relations comprising spatial relation with a reference to an RS with 'QCL-Type-D' of a TCI state of each of the 'N' activated TCI states with the 'N' lowest TCI state IDs applicable to PDSCH on the active DL BWP of the scheduled cell.

In other embodiments, if a UE is indicated to use a default UL beam(s) and transmits 'K' PUSCH repetitions with 'N' different UL beams, CORESETs and/or search spaces are not configured for an active DL BWP of a scheduled cell, and a scheduling cell and the scheduled cell are in the same frequency band (i.e. intra-band carrier aggregation), the UE performs a PUSCH transmission of 'K' PUSCH repetitions according to a spatial relation with a reference to an RS with 'QCL-Type-D' corresponding to a QCL assumption of a CORESET of the 'N' CORESETs with the 'N' lowest CORESET IDs on an active DL BWP of the scheduling cell.

In one embodiment, if a UE receives an indication of activated TCI states for UL beam(s) and an indication of using default beams and transmits 'K' PUSCH repetitions with 'N' different UL beams, the UE determines a set of 'N' default UL beams for 'K' PUSCH repetitions based on 'N' QCL assumptions of 'N' activated TCI states with the 'N' lowest TCI state IDs applicable to PUSCH on an active UL BWP of a scheduled cell. That is, the UE performs a PUSCH transmission of 'K' PUSCH repetitions according to a set of 'N' spatial relations comprising a spatial relation with a reference to an RS with 'QCL-Type-D' (or alternatively with qcl-Type of 'SpatialRelation' for UL transmission) of a TCI state of each of the 'N' activated TCI states with the 'N' lowest TCI state IDs applicable to PUSCH on the active UL BWP of the scheduled cell.

In one embodiment, a UE is configured to use a default UL beam(s) and 'K' PUCCH repetitions with 'N' different UL beams is enabled, the UE determines a set of 'N' default UL beams for 'K' PUCCH repetitions based on 'N' QCL assumptions of 'N' CORESETs with the 'N' lowest CORE- SET IDs on an active DL BWP of a PCell (for MCG) or PSCell (for SCG) or PUCCH-SCell. That is, the UE performs a PUCCH transmission of 'K' PUCCH repetitions according to a spatial relation with a reference to an RS with 'QCL-Type-D' corresponding to a QCL assumption of a CORESET of the 'N' CORESETs with the 'N' lowest CORESET IDs on the active DL BWP of the PCell or PSCell or PUCCH-SCell. In one example, if the UE is configured with higher layer parameter CORESETPoolIndex in ControlResourceSet, then the 'N' CORESETs comprise CORESET with the lowest CORESET ID associated with each of the lowest 'N' CORESETPoolIndex values.

In one embodiment, if a UE is configured to use a default UL beam(s) and 'K' PUCCH repetitions with 'N' different UL beams is enabled, and is configured with 'M' values of PUCCHResource-CORESETpoolIndex for PUCCH resources (e.g., in a selected PUCCH resource set) or 'M' PUCCH-groups ('M' values of PUCCH-groupIndex) on an active UL BWP of of the PCell or PSCell or PUCCH-SCell. In one example, the PUCCH resource with PUCCHResource-CORESETpoolIndex 'p' may be associated with a CORESETPoolIndex value 'p' in ControlResourceSet on the active DL NWP of a scheduling cell. The UE determines a set of 'N' default UL beams for 'K' PUCCH repetitions according to the spatial relation corresponding to the PUCCH resource associated with each of the lowest 'N' PUCCHResource-CORESETpoolIndex values. In another example the PUCCH group 'p' containing identities of PUCCH resources which may be associated with a CORESETPoolIndex value 'p' in ControlResourceSet on the active DL NWP of a scheduling cell. In one example, the PUCCH resources within a PUCCH group 'p' have the same spatial relation. The UE determines a set of 'N' default UL beams for 'K' PUCCH repetitions according to the spatial relation corresponding to the PUCCH resource associated with each of the lowest 'N' PUCCH-groupIndex values.

In one embodiment, if a UE is indicated to use a default UL beam(s) to transmit 'K' PUSCH repetitions with 'N' different UL beams, and is configured by higher layer parameter PDCCH-Config that contains 'N' or greater than 'N' values of CORESETPoolIndex in ControlResourceSet on an active DL BWP of a scheduled cell, then the UE determines a set of 'N' default UL beams for 'K' PUSCH repetitions based on a set of 'N' QCL assumptions comprising QCL assumption of a CORESET with the lowest CORESET ID within each of the lowest 'N' CORESETPoolIndex values on the active DL BWP of the scheduled cell. That is, the UE performs a PUSCH transmission of 'K' PUSCH repetitions according to a spatial relation with a reference to an RS with 'QCL-Type-D' corresponding to a QCL assumption of a CORESET with the lowest CORESET ID within each of the lowest 'N' CORESETPoolIndex values on the active DL BWP of the scheduled cell. In one example, for actual repetition or transmission occasion i, i=0, 1, ... K−1, the UE uses UL default beam n, n=0, 1, ... N−1 where $$n = \left\lfloor \frac{i}{\lceil K/N \rceil} \right\rfloor$$

and UL default beam n is determined according to a spatial relation with a reference to an RS with 'QCL-Type-D' corresponding to a QCL assumption of a CORESET with the lowest CORESET ID among the CORESETs configured with CORESETPoolIndex value set to n on the active DL BWP of the scheduled cell. In another example, consecutive actual repetition or transmission occasion use different UL beams, for example, the UE uses UL default beam n, n=0, 1, ... N−1 where n=i mod N.

In one alternate implementation, if the UE is configured with 'M' values of CORESETPoolIndex in ControlResourceSet on an active DL BWP of a scheduled cell and M>N, then the UE determines a set of 'N' default UL beams for 'K' PUSCH repetitions based on a set of 'N' QCL assumptions comprising QCL assumption of a CORESET with the lowest CORESET ID from a set of 'N' CORESETPoolIndex values on the active DL BWP of the scheduled cell. In one example, the set of 'N' CORESETPoolIndex values comprises values starting (and incrementing with circular wrap-around, i.e., modulo M) from the CORESETPoolIndex value associated to the CORESET in which the scheduling PDCCH for the 'K' PUSCH repetitions is received (on the scheduling cell).

In another embodiment, if a UE is indicated to use a default UL beam(s) to transmit 'K' PUSCH repetitions with 'N' different UL beams, and is configured by higher layer parameter PDCCH-Config that contains 'M' (M<N) values of CORESETPoolIndex in ControlResourceSet on an active DL BWP of a scheduled cell, for each of the first mod(N,M) CORESETPoolIndex values, the UE determines $\lceil N/M \rceil$ default UL beams based on $\lceil N/M \rceil$ QCL assumptions of CORESETs with the $\lceil N/M \rceil$ lowest CORESET IDs within a given CORESETPoolIndex on the active DL BWP of the scheduled cell, where $\lceil X \rceil$ rounds X to the nearest integer no less than X. For each of the remaining (M−mod(N,M)) CORESETPoolIndex values, the UE determines $\lfloor N/M \rfloor$ default UL beams based on $\lfloor N/M \rfloor$ QCL assumptions of CORESETs with the $\lfloor N/M \rfloor$ lowest CORESET IDs within a given CORESETPoolIndex, where $\lfloor X \rfloor$ rounds X to the nearest integer no larger than X.

In one embodiment, if a UE is indicated with N or more activated TCI states using single TCI ID for UL beam(s) and an indication of using default beams and transmits 'K' PUSCH repetitions with 'N' different UL beams, then the UE determines a set of 'N' default UL beams for 'K' PUSCH repetitions based on 'N' QCL assumptions of 'N' activated TCI states with the lowest TCI state ID applicable to PUSCH on an active UL BWP of a scheduled cell. That is, the UE performs a PUSCH transmission of 'K' PUSCH repetitions according to a UL spatial relation with a reference to an RS with 'QCL-Type-D' (or alternatively with qcl-Type of 'SpatialRelation' for UL transmission) of a TCI state of the 'N' activated TCI states with the lowest TCI state ID applicable to PUSCH on the active UL BWP of the scheduled cell.

In one embodiment, an UL beam of the 'N' UL default beams for 'K' PUSCH/PUCCH repetitions is determined based on one of at least one of the following options.

The UL beam can be determined based on spatial relation with a reference to the RS with 'QCL-Type-D' corresponding to the QCL assumption of the CORESET with a predetermined CORESET ID on an active DL BWP of a scheduled cell, such as in case when CORESET(s) are configured on the scheduled cell. The predetermined CORESET ID may be for example, the lowest CORESET ID or based on one or more of position/index of the UL beam in the set of 'N' UL default beams, CORESETPoolIndex value (such as a CORESET from a CORESET pool associated with a predetermined CORESETPoolIndex value), number of configured CORESETs, number of configured CORESETs with a given CORESETPoolIndex value, number of configured CORESETs with different CORESETPoolIndex values, configured maximum value of CORESETPoolIndex, number of UL default beams ('N'). This may be the case when TCI-states applicable for PUSCH are not configured on the active UL BWP of the scheduled cell. In one example, when CORESETs are not configured on the scheduled cell, the CORESET IDs of the scheduling cell are used.

The UL beam can be determined based on spatial relation with a reference to the RS with 'QCL-Type-D' corresponding to the QCL assumption of the CORESET comprising the scheduling PDCCH (e.g., TCI state of scheduling PDCCH) on an active DL BWP of a scheduling cell. This may be used for the determining the spatial relation of the first default UL beam. In one example, the spatial relation for the 'N' UL default beams may be based on the CORESET ID of the CORESET in which the scheduling PDCCH is received (on the scheduling cell).

The UL beam can be determined based on spatial relation with a reference to an RS with 'QCL-Type-D' of an activated TCI state of a predetermined TCI state ID (e.g., based on the position/index of the UL beam in the set of 'N' UL default beams) applicable to PDSCH on the active DL BWP of the of the scheduled cell. This may be the case when CORESETs are not configured on the scheduled cell or TCI-states applicable to PUSCH are not configured on the schedule cell.

The UL beam can be determined based on spatial relation with a reference to an RS (e.g., with qcl-Type of 'Spatial-Relation') of an activated TCI state of a predetermined TCI state ID (e.g., based on the position/index of the UL beam in the set of 'N' UL default beams) applicable to PUSCH on the active UL BWP of the of the scheduled cell. This may be the case when CORESETs are not configured on the scheduled cell.

The UL beam can be determined based on spatial relation corresponding to the PUCCH resource associated with a predetermined PUCCHResource-CORESETpoolIndex on the active UL BWP of the of the scheduled cell or the serving cell comprising the PUCCH resource (i.e., PUCCH is transmitted). The predetermined PUCCHResource-CORESETpoolIndex may be based on one or more of position/index of the UL beam in the set of 'N' UL default beams, number of configured CORESET pools, number of configured/activated PUCCH resources with a given PUCCHResource-CORESETpoolIndex value, number of configured/activated PUCCH resources with different PUCCHResource-CORESETpoolIndex value (e.g., within a PUCCH resource set), the configured maximum value of PUCCHResource-CORESETpoolIndex, number of UL default beams ('N').

The UL beam can be determined based on spatial relation corresponding to the PUCCH resource associated with a predetermined PUCCH-groupIndex on the active UL BWP of the scheduled cell or the serving cell comprising the PUCCH resource. The predetermined PUCCH-groupIndex may be based on one or more of position/index of the UL beam in the set of 'N' UL default beams, number of configured/activated PUCCH groups or pools, number of configured/activated PUCCH resources with a given PUCCH group or pool, number of configured/activated PUCCH resources with different PUCCH-groupIndex value (e.g., within a PUCCH resource set), the configured maximum value of PUCCH-groupIndex, number of UL default beams ('N').

In one example, for an UL beam of the 'N' UL default beams for 'K' PUSCH/PUCCH repetitions, the UE transmits the PUSCH/PUCCH repetition with the same spatial domain transmission filter used for reception of the reference RS with 'QCL-Type-D' or reception (DLRS such as SSB, CSI-RS)/transmission (such as SRS for beam management) spatial relation reference RS (e.g., with qcl-Type of 'SpatialRelation'). In one example, the pathloss RS for determining the pathloss for the PUSCH/PUCCH repetition with a given UL beam is the same as the reference RS used for determining the spatial relation for the UL beam or for one of the UL beams of the 'N' UL beams (e.g., the first UL beam, and the same pathloss is used for all the 'K' PUSCH/PUCCH repetitions).

A possible embodiment can provide enhanced beam reporting and fast UL beam adaptation. This embodiment proposes a method of enhanced beam measurement reporting for a case that an UL beam different from a DL beam needs to be used for MPE limitation. The UL beam may be different from the DL beam because a UE uses two different spatial filters for a given DL RS, a first spatial filter to generate the UL beam and a second spatial filter to receive the DL beam (e.g., when the UE does not support full reciprocity or beam correspondence). The first and second spatial filters may be generated from different UE antenna panels. In another case, the UE may choose the first spatial filter to generate the UL beam associated with a first DL RS and the second spatial filter to generate the DL beam associated with a second DL RS.

Other possible embodiments can provide methods of TCI state configuration and activation/deactivation for fast UL beam adaptation.

In one embodiment, if a UE is configured with layer1 (L1) DL RS measurements and reporting, e.g. configured with a CSI-ReportConfig with the higher layer parameter reportQuantity set to 'cri-RSRP' or 'ssb-Index-RSRP', the UE reports a first DL RS index (e.g. CRI or SSBRI) that can be used for DL receptions (e.g. QCL-Type-D reference RS for PDCCH/PDSCH) and a second DL RS index that can be used for UL transmissions (e.g. spatial relation reference RS for PUCCH/PUSCH) in a single reporting instance. The first DL RS index may be different from the second DL RS index. If the first DL RS index and the second DL RS index are the same, the UE may apply different spatial filters for DL and UL beams, respectively. Additionally, the UE may be configured with a reserved DL RS index (e.g. all zero or all ones bits). If the UE selects one DL RS with the same spatial filters for DL and UL beams, the UE can indicate the same DL and UL beams by reporting one selected DL RS index and one reserved DL RS index.

In one implementation, if the UE is further configured with group-based beam reporting, i.e. the higher layer parameter groupBasedBeamReporting set to 'enabled', the UE reports a first set of DL RS indexes (e.g. two indexes) for potential DL beams to be used and a second set of DL RS indexes for potential UL beams to be used in a single reporting instance.

In another implementation, whether to report the first and second DL RS indexes (or the first and second set of DL RS indexes) for DL and UL, respectively, in a single reporting instance is indicated in a CSI report configuration (e.g. CSI-ReportConfig).

In another embodiment, a UE assumes that a TCI state configuration for DL is applicable to UL, if the TCI state configuration for UL is not separately signalled. The 'QCL-Type-D' reference RS of the DL TCI state is used as the spatial relation reference RS for the corresponding UL TCI state. Further, the UE may receive a 'TCI State Activation/Deactivation for PUSCH' MAC CE, which can activate a set of UL TCI states different from a set of activated DL TCI states. For a given RS with 'QCL-Type-D' (or alternatively with qcl-Type of 'SpatialRelation' for UL transmission) of a given TCI state, an UL spatial relation to the RS may or may not be the same as a DL spatial relation to the RS (i.e. the UL spatial filter may or may not be the same as the DL spatial filter for the given RS).

In other embodiments, a UE receives an indication of TCI states to be used for determining UL spatial relation in PUSCH transmission via semi-static signaling (e.g. for Type 1 configured grant PUSCH) or dynamic signaling (e.g. for Type 2 configured grant PUSCH and for dynamic grant PUSCH). A DCI format activating a Type 2 configured grant PUSCH or scheduling a dynamic grant PUSCH may include a TCI state indication field.

In one embodiment, the UE PHR MAC CE report may include an indication of the average UE transmit power over a most recent X second (e.g., X=1 or 5 seconds) window. The gNB may use this indication to determine the appropriate UL duty cycle and/or power-level for subsequent UL transmissions to avoid potential MPE (FR2)/SAR (FR1) related UE action (large P-MPR backoff) to meet regulatory MPE/SAR exposure requirements.

In one example, the average UE transmit power reported is the average UL transmit power for the antenna panel/array used for transmitting the PHR report.

In one example, the UE includes the average UE transmit power only if the average UE transmit power measure is over a certain threshold and/or the UE applies P-MPR (e.g, and power backoff due to power management 'P' field in the MAC CE is set to '1'). The threshold may be predetermined or configured by the gNB. In one example, UE is triggered to report PHR if the average UE transmit power measure is over a certain threshold (in addition to the prior art event conditions described in TS 38.321). The average UE transmit power indication may be quantized to cover the range near the power class of the UE (e.g., 1 dB steps from 10 to 23 dBm for UE power class 3 with a codepoint to indicate average UE transmit power power<10 dB).

In an alternate embodiment, the UE PHR MAC CE report may include an indication of whether the current transmit power-setting (e.g., associated with the PUSCH transmission comprising the PHR MAC CE) for Y additional seconds with a reference UL duty cycle the UE would result in a need for the UE to take action to reduce MPE/SAR (e.g., large P-MPR backoff or temporarily turn-off the antenna panel/array). Y may be a single value or a set of values, predetermined, configured by gNB or indicated by the UE from a set of possible values (e.g., 0.5 sec, 1 sec, 3 sec, 5 sec—based on the reference UL duty cycle).

In one example, the UE includes the indication and/or the value of Y (e.g., smallest value) if the UE would need to take action related to MPE/SAR power management.

In one example, the UE also includes the indication and/or the value of Y if the UE applies P-MPR (e.g, and power backoff due to power management 'P' field in the MAC CE is set to '1').

In this case, the value of Y=Y' (potentially selected from a different set of values (e.g., 0, 100 ms, 300 ms, 500 ms) for a reference UL duty cycle indicates the minimum amount time before the UE would stop applying the MPE/SAR reductions actions (with the current transmit power setting and reference UL duty cycle). In one example, the reference UL duty cycle may be predetermined, configured by gNB. In one example, UE is triggered to report PHR if the UE is likely or expected to take action related to MPE/SAR power management (e.g., when the indication would be included in the PHR report or Y is smaller than the maximum value in set of Y values) in addition to the prior art event conditions described in TS 38.321.

According to at least some embodiments, default UL beams can be defined for repeated UL transmissions with different UL beams for URLLC and/or coverage enhancement based on DL beams. Enabling a UE to use a common set of beams for DL and UL communications, i.e. to employ spatial filters used for DL receptions as spatial filters for UL transmissions, can reduce latency and overhead involved with UL beam management and indication, compared to SRS based UL beam management.

Similarly, a default set of activated UL beams can be defined based on a set of activated DL beams. Enabling a UE to use a common set of beams for DL and UL communications, i.e. to employ spatial filters used for DL receptions as spatial filters for UL transmissions, can significantly reduce latency and overhead involved with UL beam management and indication, compared to SRS based UL beam management.

Beam measurement reporting can be enhanced by allowing a UE to simultaneously report UL and DL beams at a single reporting instance. The UL beam may be different from the DL beam because the UE uses two different spatial filters for a given DL RS due to MPE limitation, a first spatial filter to generate the UL beam and a second spatial filter to receive the DL beam. The first and second spatial filters may be generated from different UE antenna panels. In addition, the UE may report different UL and DL beams, each associated with a different DL RS.

SRS based UL beam management and indication in Rel-15/16 NR may lead to signaling overhead and latency related to SRS resource configuration, triggering, and UL beam indication, radio resource overhead for SRS resources, and UE power consumption for SRS transmissions. At least some embodiments can allow fast UL beam adaptation with low overhead.

To handle the MPE issue, R4-1913576 proposed enhancing PHR MAC CE with inclusion of relevant information on the UE UL duty cycle preference and P-MPR. However, this type of Rel-16 MPE enhancement may limit the UL duty cycle and does not prevent from the beginning a gNB from assigning a problematic UL beam for UE's UL transmissions.

According to a possible embodiment, if a UE is configured to use default UL beams, more than one default UL beams for PUSCH/PUCCH repetitions are determined based on more than one DL beams used for PDCCH or PDSCH receptions on a scheduled cell or more than one DL beams used for PDCCH receptions on a scheduling cell.

According to a possible embodiment, if configured in a CSI measurement report configuration, a UE reports a first DL RS index for DL receptions and a second DL RS index for UL transmissions in a single reporting instance. The first and second DL RS indexes may be different. If the first and second DL RS indexes are the same, different spatial filters for DL and UL beams are applied. If one DL RS with the same spatial filters for DL and UL beams is selected, one selected DL RS index and one reserved DL RS index are reported, where the reserved DL RS index can be configured or pre-defined.

Figure 2:
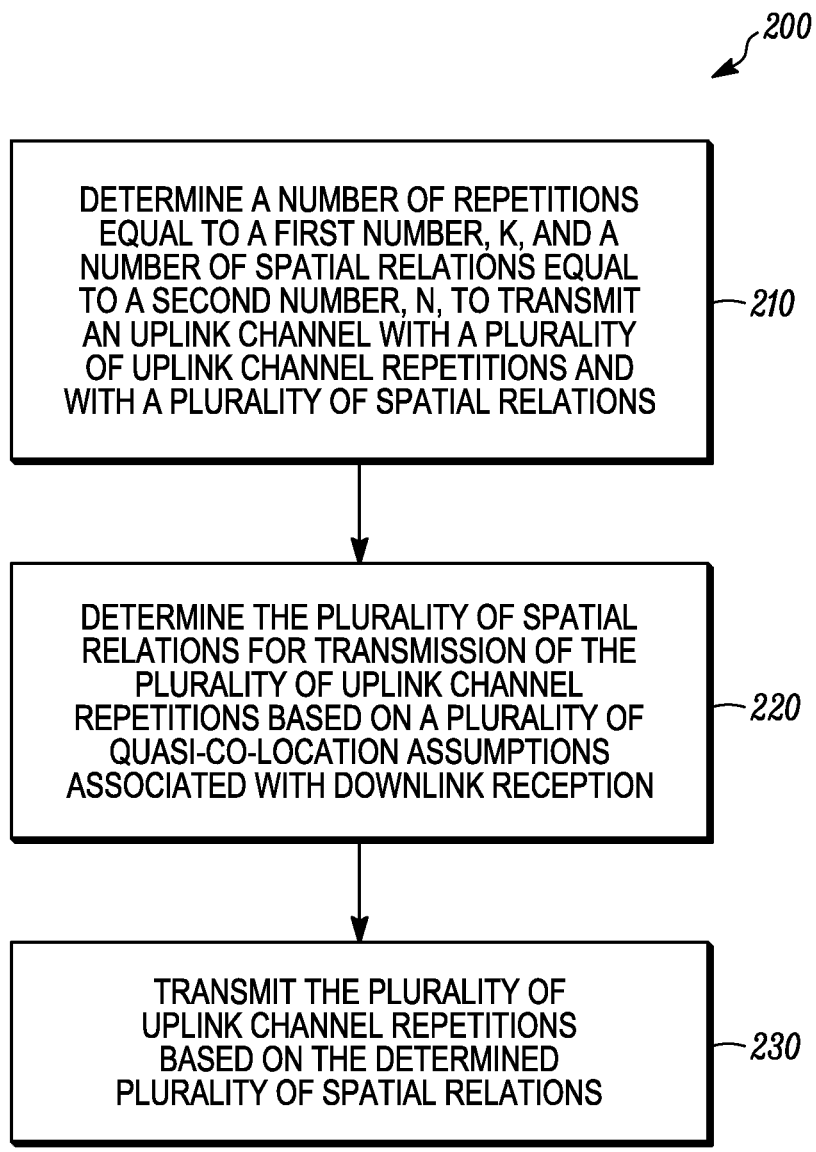
FIG. 2 is an example flowchart illustrating the operation of an apparatus according to a possible embodiment.

FIG. 2 is an example flowchart 200 illustrating the operation of a wireless communication device, such as the UE 110, according to a possible embodiment. At 210, a number of repetitions equal to a first number, K, and a number of spatial relations equal to a second number, N, can be determined to transmit an uplink channel with a plurality of uplink channel repetitions and with a plurality of spatial relations. A total number of the plurality of uplink channel repetitions can be the first number, K, of repetitions and a total number of the plurality of spatial relations can be the second number, N, of spatial relations. At 220, the plurality of spatial relations for transmission of the plurality of uplink channel repetitions can be determined based on a plurality of quasi-co-location assumptions associated with downlink reception. At 230, the plurality of uplink channel repetitions can be transmitted based on the determined plurality of spatial relations.

According to a possible embodiment, an indication can be received that indicates to use one or more default beams for transmission of the uplink channel, where the determined plurality of spatial relations can be determined beams of the one or more default beams.

According to a possible embodiment, the plurality of quasi-co-location assumptions associated with the downlink reception can be a plurality of quasi-co-location assumptions associated with a set of control resource sets.

According to a possible embodiment, the set of control resource sets can be the second number, N, of control resource sets from a plurality of control resource sets configured in an active downlink bandwidth part of a serving cell.

According to a possible implementation of the above embodiment, transmitting the plurality of uplink channel repetitions can include transmitting the plurality of uplink channel repetitions on the serving cell.

According to a possible implementation of the above embodiment, the serving cell can be a first serving cell. Transmitting the plurality of uplink channel repetitions can include transmitting the plurality of uplink channel repetitions on a second serving cell different from the first serving cell. The first serving cell can be a scheduling cell and the second serving cell is a scheduled cell.

According to a possible implementation of the above embodiment, the second number, N, of control resource sets can be the second number, N, of control resource sets with the second number, N, of lowest control resource set identities from the plurality of control resource sets.

According to a possible implementation of the above embodiment, configuration of a plurality of control resource set pools can be received. Each of the second number, N, of control resource sets can correspond to a control resource set with a lowest control resource set identity in each of the second number, N, of control resource set pools of the plurality of control resource set pools. For example, each CORESET pool can have a CORESETPoolIndex value. Each CORESET pool can have one or more CORESETs, and each CORESET can have a CORESET ID. According to a possible example, CORSET pool 1={CORESET ID=1, CORESET ID=3}, CORESET pool 2={CORESET ID=2, CORESET ID=4}. First, N CORESET pools can be selected with the N lowest CORESETPoolIndex values. Second, in each selected CORESET pool, one CORESET can be selected with the lowest CORESET ID.

According to a possible embodiment, the plurality of quasi-co-location assumptions associated with the downlink reception can be a plurality of quasi-co-location assumptions of a plurality of TCI states configured in an active downlink bandwidth part of a serving cell. A TCI-State contains parameters for configuring a quasi co-location relationship between one or two downlink reference signals and the DM-RS ports of the PDSCH, the DM-RS port of PDCCH or the CSI-RS port(s) of a CSI-RS resource.

According to a possible implementation of the above embodiment, the plurality of TCI states can be the second number, N, of activated TCI states associated with reception of a physical downlink shared channel in the active downlink bandwidth part of the serving cell.

According to a possible implementation of the above embodiment, the plurality of TCI states can be the second number, N, of activated TCI states associated with transmission of a physical uplink channel.

According to a possible embodiment, scheduling information of the uplink channel can be received. The number of repetitions can be determined based on the scheduling information. For example, a PUSCH can be scheduled by DCI format 0_1 or 0_2, which can include the number of repetitions as numberofrepetitions.

According to a possible implementation of the above embodiment, the number of spatial relations can be determined based on the scheduling information. According to a possible implementation of the above embodiment, the number of repetitions can be a number of nominal repetitions.

According to a possible embodiment, at least one spatial relation of the plurality of spatial relations can be predetermined.

Figure 3:
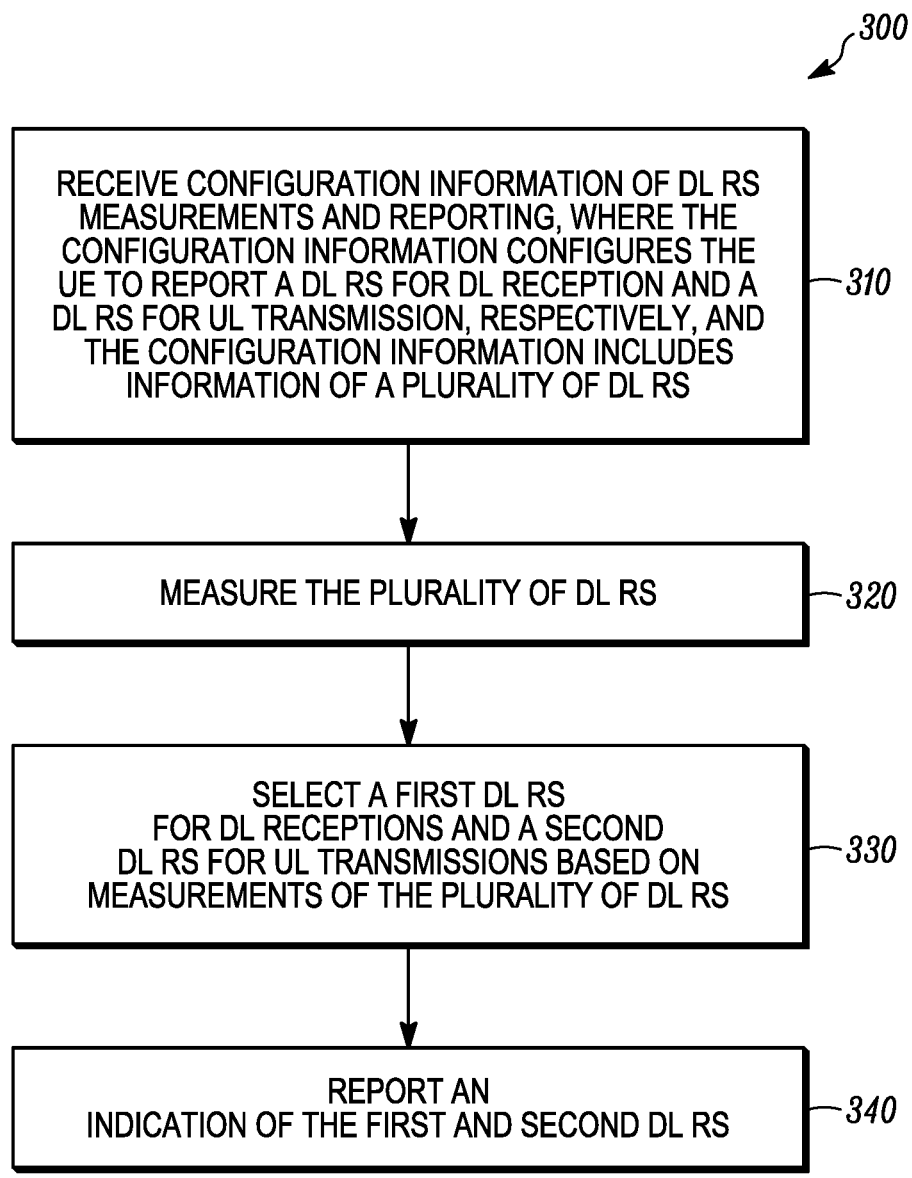
FIG. 3 is an example flowchart illustrating the operation of an apparatus according to a possible embodiment.

FIG. 3 is an example flowchart 300 illustrating the operation of a wireless communication device, such as the UE 110, according to a possible embodiment. At 310, configuration information of DL RS measurements and reporting can be received. The configuration information can configure the UE to report a DL RS for DL reception and a DL RS for UL transmission, respectively, and the configuration information can include information of a plurality of DL RSs. At 320, the plurality of DL RSs can be measured. At 330, a first DL RS can be selected for DL receptions and a second DL RS can be selected for UL transmissions based on measurements of the plurality of DL RSs. At 340, an indication of the first and second DL RSs can be reported, such as transmitted, sent, or otherwise reported.

According to a possible embodiment, the first DL RS can be different from the second DL RS.

According to a possible embodiment, the first DL RS can be the same as the second DL RS and different spatial filters can be applied to the first and second DL RS.

According to a possible embodiment, reporting the indication of the first and second DL RSs can include reporting a first DL RS index and a second DL RS index. The first DL RS index can correspond to the first DL RS and the second DL RS index can be a reserved DL RS index. The reserved DL RS index for the second DL RS index can indicate that the first and second DL RSs are the same and same spatial filters are applied to the first and second DL RSs.

According to a possible embodiment, a PHR can be transmitted on a PUSCH in response to a triggering event. The PHR can include an indication related to a transmission condition corresponding to an MPE/SAR reduction action by the UE. For example, the transmission condition can correspond to a MPE/SAR reduction action by being a condition that can result in a potential MPE/SAR reduction action by the UE.

According to a possible implementation of the above embodiment, the indication can be an average UE transmit power over a most recent window of a number of seconds. For example, the window can be a 1 second window, a 5 second window, or any other time duration of a window.

According to a possible example of the above implementation, the indicated average UE transmit power can be an average UL transmit power for an antenna panel/array used for transmitting the PHR on the PUSCH.

According to a possible example of the above implementation, a determination can be made as to whether to include the average UE transmit power in the PHR based on the average UE transmit power being over a certain threshold and/or application by the UE of P-MPR. For example, the UE can apply the P-MPR by setting the power management 'P' field in the MAC CE to '1'.

According to a possible example of the above implementation, the threshold can be predetermined and/or configured by the gNB.

According to a possible implementation of the above embodiment, the triggering event can be the average UE transmit power being over a threshold.

According to a possible implementation of the above embodiment, the indication can indicate whether a transmit power-setting associated with a PUSCH transmission for a number of additional seconds with a reference UL duty cycle would result in a transmission condition requiring a potential MPE/SAR reduction action by the UE. The number of additional seconds can be a single value, a set of values, predetermined, configured by a gNB, indicated by the UE from a set of possible values, and/or determined or indicated by any other method.

According to a possible example of the above implementation, a determination can be made as to whether to include the indication in the PHR based on the UE needing to take action related to MPE/SAR power management and/or application by the UE of P-MPR. For example, the UE can apply the P-MPR by setting the power management 'P' field in the MAC CE to '1'.

According to a possible example of the above implementation, the number of additional seconds in the PHR can be indicated, such as to the gNB.

According to a possible example of the above implementation, a minimum time duration before the UE no longer needs to apply the MPE/SAR reduction action can be indicated, such as indicated to the gNB.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments. Additionally, a network entity, such as a base station, transmission and reception point, mobility management entity, or other network entity, can perform reciprocal operations of a UE. For example, the network entity can transmit signals received by the UE and can receive signals transmitted by the UE. The network entity can also process and operate on sent and received signals.

Figure 4:
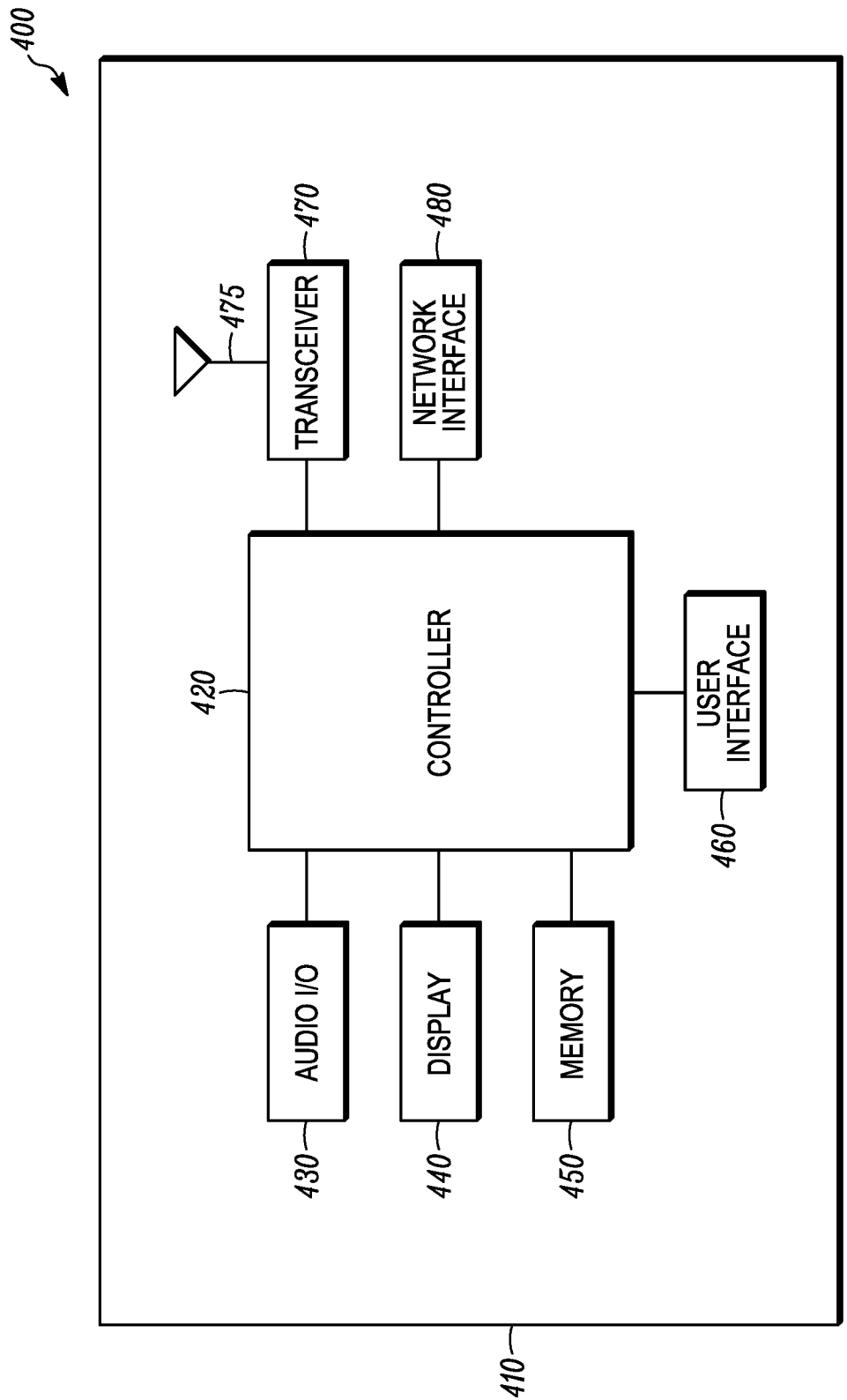
FIG. 4 is an example block diagram of an apparatus according to a possible embodiment.

FIG. 4 is an example block diagram of an apparatus 400, such as the UE 110, the network entity 120, or any other wireless communication device disclosed herein, according to a possible embodiment. The apparatus 400 can include a housing 410, a controller 420 coupled to the housing 410, audio input and output circuitry 430 coupled to the controller 420, a display 440 coupled to the controller 420, a memory 450 coupled to the controller 420, a user interface 460 coupled to the controller 420, a transceiver 470 coupled to the controller 420, at least one antenna 475 coupled to the transceiver 470, and a network interface 480 coupled to the controller 420. The apparatus 400 may not necessarily include all of the illustrated elements for different embodiments of the present disclosure. The apparatus 400 can perform the methods described in all the embodiments.

The display 440 can be a viewfinder, an LCD, an LED display, an OLED display, a plasma display, a projection display, a touch screen, or any other device that displays information. The transceiver 470 can be one or more transceivers that can include a transmitter and/or a receiver. The audio input and output circuitry 430 can include a microphone, a speaker, a transducer, or any other audio input and output circuitry. The user interface 460 can include a keypad, a keyboard, buttons, a touch pad, a joystick, a touch screen display, another additional display, or any other device useful for providing an interface between a user and an electronic device. The network interface 480 can be a USB port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 450 can include a RAM, a ROM, an EPROM, an optical memory, a solid-state memory, a flash memory, a removable memory, a hard drive, a cache, or any other memory that can be coupled to an apparatus.

The apparatus 400 or the controller 420 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 450, elsewhere on the apparatus 400, in cloud storage, and/or anywhere else that can store software and/or an operating system. For example, coding for operations can be implemented as firmware programmed into ROM. The apparatus 400 or the controller 420 may also use hardware to implement disclosed operations. For example, the controller 420 may be any programmable processor. Furthermore, the controller 420 may perform some or all of the disclosed operations. For example, at least some operations can be performed using cloud computing and the controller 420 may perform other operations. At least some operations can also be performed computer executable instructions executed by at least one computer processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 420 may be any controller or processor device or devices capable of operating an apparatus and implementing the disclosed embodiments. Some or all of the additional elements of the apparatus 400 can also perform some or all of the operations of the disclosed embodiments.

In operation, the apparatus 400 can perform the methods and operations of the disclosed embodiments. The transceiver 470 can transmit and receive signals, including data signals and control signals that can include respective data and control information. The controller 420 can generate and process the transmitted and received signals and information.

In operation according to a possible embodiment, the controller 420 can determine a number of repetitions equal to a first number, K, and a number of spatial relations equal to a second number, N, to transmit an uplink channel with a plurality of uplink channel repetitions and with a plurality of spatial relations. A total number of the plurality of uplink channel repetitions can be the first number, K, of repetitions and a total number of the plurality of spatial relations can be the second number, N, of spatial relations. The controller 420 can determine the plurality of spatial relations for transmission of the plurality of uplink channel repetitions based on a plurality of quasi-co-location assumptions associated with downlink reception. The transceiver 470 can transmit the plurality of uplink channel repetitions based on the determined plurality of spatial relations.

According to a possible embodiment, the transceiver 470 can receive an indication to use one or more default beams for transmission of the uplink channel. The determined plurality of spatial relations can be determined beams of the one or more default beams.

According to a possible embodiment, the plurality of quasi-co-location assumptions associated with the downlink reception can be a plurality of quasi-co-location assumptions associated with a set of control resource sets.

According to a possible embodiment, the plurality of quasi-co-location assumptions associated with the downlink reception can be a plurality of quasi-co-location assumptions of a plurality of TCI states configured in an active downlink bandwidth part of a serving cell.

According to a possible embodiment, at least one spatial relation of the plurality of spatial relations can be predetermined.

In operation according to a possible embodiment, the transceiver 470 can receive configuration information of DL RS measurements and reporting. The configuration information can configure the apparatus to report a DL RS for DL reception and a DL RS for UL transmission, respectively, and the configuration information can include information of a plurality of DL RSs. The controller 420 can measure the plurality of DL RSs. The controller 420 can select a first DL RS for DL receptions and a second DL RS for UL transmissions based on measurements of the plurality of DL RSs. The controller 420 can report an indication of the first and second DL RSs.

According to a possible embodiment, the first DL RS can be different from the second DL RS. According to a possible embodiment, the first DL RS can be the same as the second DL RS and the controller 420 can apply different spatial filters to the first and second DL RS.

According to a possible embodiment, reporting the indication of the first and second DL RSs can include reporting a first DL RS index and a second DL RS index. The first DL RS index can correspond to the first DL RS and the second DL RS index can be a reserved DL RS index. The reserved DL RS index for the second DL RS index can indicate that the first and second DL RSs are the same and same spatial filters are applied to the first and second DL RSs.

According to a possible embodiment, the transceiver 470 can transmit a PHR on a PUSCH in response to a triggering event. The PHR can include an indication related to a transmission condition corresponding to an MPE/SAR reduction action by the UE. According to a possible implementation, the indication can be an average UE transmit power over a most recent window of a number of seconds.

According to other possible embodiments, a method at a UE can include determining to transmit a PUSCH with a first number of repetitions and a second number of default UL beams. The method can include determining the second number of UL beams for the first number of PUSCH repetitions based on the second number of QCL assumptions of the second number of CORESETs with the second number of lowest CORESET IDs on an active DL BWP of a scheduled cell. The method can include transmitting the first number of PUSCH repetitions based on the determined second number of UL beams.

According to a possible implementation, transmitting the first number of PUSCH repetitions comprises performing $\lceil K/N \rceil$ repetitions for each of K mod(N) UL beams and $\lfloor K/N \rfloor$ repetitions for each of the remaining (N−K mod(N)) UL beams, where $\lceil X \rceil$ rounds X to the nearest integer no less than X, $\lfloor X \rfloor$ rounds X to the nearest integer no larger than X, mod is a modulo operator, K is the first number, and N is the second number.

According to a possible implementation, the method can include, if the second number of CORESETs are not configured for the active DL BWP of the scheduled cell, the second number of UL beams for the first number of PUSCH repetitions is determined based on the second number of QCL assumptions of the second number of activated TCI states with the second number of lowest TCI state IDs applicable to a downlink data channel on the active DL BWP of the scheduled cell.

According to a possible implementation, the method can include, if the second number of CORESETs are not configured for the active DL BWP of the scheduled cell, the second number of UL beams for the first number of PUSCH repetitions is determined based on the second number of QCL assumptions of the second number of CORESETs with the second number of lowest CORESET IDs on an active DL BWP of the scheduling cell.

According to a possible implementation, the method can include receiving configuration of a third number of CORESETPoolIndex values on the active DL BWP of the scheduled cell, wherein the second number of UL beams for the first number of PUSCH repetitions is determined based on a QCL assumption of a CORESET with the lowest CORESET ID within each of the second number of lowest CORESETPoolIndex values on the active DL BWP of the scheduled cell, wherein the third number is not less than the second number.

According to a possible implementation, the method can include receiving an indication to use one or more default UL beams for UL transmissions.

According to a possible implementation, the method can include determining at least one beam of the second number of default UL beams based on spatial relation with a reference to the RS with 'QCL-Type-D' corresponding to the QCL assumption of the CORESET comprising a scheduling PDCCH on a scheduling cell associated to the PUSCH transmission.

According to a possible implementation, the method can include determining at least one beam of the second number of default UL beams based on spatial relation with a reference to the RS of an activated TCI state of a predetermined TCI state ID applicable to PUSCH on the active UL BWP of the of the scheduled cell. The predetermined TCI state ID can be based on the index of the UL beam in the second number of default UL beams.

According to a possible implementation, the method can include determining at least one beam of the second number of default UL beams based on spatial relation corresponding to a PUCCH resource associated with a predetermined PUCCHResource-CORESETpoolIndex.

According to a possible implementation, the method can include determining at least one beam of the second number of default UL beams based on spatial relation corresponding to the PUCCH resource associated with a predetermined PUCCH-groupIndex.

According to another possible embodiment, a method at a UE can include receiving configuration information of DL RS measurements and reporting, wherein the configuration information configures to report a DL RS for DL reception and a DL RS for UL transmission, separately and includes information of a plurality of DL RS. The method can include measuring the plurality of DL RS. The method can include selecting a first DL RS for DL receptions and a second DL RS for UL transmissions based on measurements of the plurality of DL RS. The method can include reporting an indication of the first and second DL RS in a single reporting instance.

According to a possible implementation, the first DL RS is different from the second DL RS.

According to a possible implementation, the first DL RS is same as the second DL RS, and the method further comprises applying different spatial filters to the first and second DL RS, respectively.

According to a possible implementation, reporting the indication of the first and second DL RS comprises reporting a first DL RS index and a second DL RS index, wherein the first DL RS index corresponds to the first DL RS and the second DL RS index is a reserved DL RS index, wherein the first and second DL RS are the same, and same spatial filters are applied to the first and second DL RS.

According to a possible embodiment, a method at a UE can include transmitting a PHR MAC CE report on a PUSCH in response to a triggering event. The PHR report comprises an indication related to a transmission condition that can result in a potential MPE/SAR reduction action by the UE.

According to a possible implementation, the indication comprises an average UE transmit power over a most recent X second (e.g., X=1 or 5 seconds) window.

According to a possible example of the above implementation, the average UE transmit power reported is the average UL transmit power for the antenna panel/array used for transmitting the PHR report on the PUSCH.

According to a possible example of the above implementation, the method can include determining whether to include the average UE transmit power in the PHR based on one or more of the average UE transmit power measure is over a certain threshold, application by the UE of P-MPR by setting the power management 'P' field in the MAC CE to '1'.

According to a possible example of the above implementation, the threshold may be predetermined or configured by the gNB.

According to a possible example of the above implementation, the triggering event comprises an event of the average UE transmit power measure is over a threshold.

According to a possible implementation, the indication indicates whether the transmit power-setting associated with the PUSCH transmission for Y additional seconds with a first reference UL duty cycle would result in a transmission condition requiring a potential MPE/SAR reduction action by the UE.

According to a possible example of the above implementation, Y may be a single value or a set of values, predetermined, configured by gNB or indicated by the UE from a set of possible values.

According to a possible example of the above implementation, the triggering event comprises the UE is likely or expected to take action related to MPE/SAR power management the transmit power-setting associated with the PUSCH transmission for Y additional seconds with a first reference UL duty cycle would likely or expected to result in a transmission condition requiring a potential MPE/SAR reduction action by the UE.

According to a possible example of the above implementation, the method can include determining whether to include the indication in the PHR based on one or more of the UE would need to take action related to MPE/SAR power management, or application by the UE of P-MPR by setting the power management 'P' field in the PHR MAC CE to '1'.

According to a possible embodiment of the above example, the method can include setting the power management 'P' field in the PHR MAC CE to '1', and the indication can indicate the minimum amount time before the UE would no longer need to apply the MPE/SAR reductions actions with transmit power setting associated with the PUSCH transmission and a second reference UL duty cycle.

According to a possible embodiment of the above example, the second reference UL duty cycle may be different than the first reference UL duty cycle.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is not admitted as prior art, is written as the inventor's own understanding of the context of some embodiments at the time of filing, and includes the inventor's own recognition of any problems with existing technologies and/or problems experienced in the inventor's own work.

LIST OF ABBREVIATIONS

3GPP 3rd Generation Partnership Project
5G Fifth Generation
ACK Acknowledgement
A-CSI Aperiodic CSI
BWP Bandwidth Part
CC Component Carrier
CCCH SDU Common Control Channel Service Data Unit
CCE Control Channel Element
CDMA Code Division Multiple Access
CRC Cyclic Redundancy Check
CRI CSI-RS Resource Index
C-RNTI Cell RNTI
CSI-RS Channel State Information Reference Signal
CSI Channel State Information
CSS Common Search Space
DCI Downlink Control Information
DL Downlink
DMRS Demodulation Reference Signal
eNB Enhanced NodeB
gNB New Radio NodeB
HARQ-ACK Hybrid Automatic Repeat Request-Acknowledgement
HST High Speed Train
IoT Internet of Things
LTE Long Term Evolution
MAC CE Medium Access Control Control Element
MCG Master Cell Group
MCS Modulation and Coding Scheme
MPE Maximum Permissible Exposure
NACK Non-Acknowledgement
NUL Non-supplementary Uplink
NR New Radio
OFDMA Orthogonal Frequency Division Multiple Access
PCell Primary Cell
PDCCH Physical Downlink Control Channel
PDSCH Physical Downlink Shared Channel
PDU Protocol Data Unit
PHR Power Headroom Report
P-MPR Power Management Maximum Power Reduction
PRACH Physical Random Access Channel
PUCCH Physical Uplink Control Channel
PUSCH Physical Uplink Shared Channel
FDD Frequency Division Duplex
QCL Quasi-co-location
RAR Random Access Response
RLF Radio Link Failure
RNTI Radio Network Temporary Identifier
RRM Radio Resource Management
RS Reference Signal
RSRP Reference Signal Received Power
SAR Specific Absorption Rate
SCell Secondary Cell
SCG Secondary Cell Group
SFI Slot Format Indicator
SFN Single Frequency Network
SpCell Special Cell (i.e. a PCell of a MCG or SCG)
SS/PBCH Synchronization Signal/Physical Broadcast Channel
SSBRI SS/PBCH Block Resource Index
SR Scheduling Request
SP-CSI Semi-persistent CSI
SPS Semi-persistent scheduling
SRS Sounding Reference Signal
SRI SRS Resource Indicator
SUL Supplementary Uplink
TB Transport block
TCI Transmission Configuration Indicator
TC-RNTI Temporary Cell RNTI
TDD Time Division Duplex
TDMA Time Division Multiple Access
UCI Uplink Control Information
UE User Equipment
UL Uplink
URLLC Ultra-Reliable Low-Latency Communication
TRP Transmission and Reception Point
USS UE-specific Search Space

We claim:

1. A method performed by a user equipment (UE), the method comprising:
  determining, by the UE, a number of repetitions equal to a first number, K, and a number of spatial relations equal to a second number, N, to transmit an uplink channel with a plurality of uplink channel repetitions and with a plurality of spatial relations,
    where a total number of the plurality of uplink channel repetitions comprise the first number, K, of repetitions and a total number of the plurality of spatial relations comprise the second number, N, of spatial relations;
  determining the plurality of spatial relations for transmission of the plurality of uplink channel repetitions based on a plurality of quasi-co-location assumptions associated with downlink reception; and
  transmitting the plurality of uplink channel repetitions based on the determined plurality of spatial relations.

2. The method according to claim 1, further comprising receiving an indication to use one or more default beams for transmission of the uplink channel, where the determined plurality of spatial relations comprise determined beams of the one or more default beams.

3. The method according to claim 1, wherein the plurality of quasi-co-location assumptions associated with the downlink reception comprise a plurality of quasi-co-location assumptions associated with a set of control resource sets.

4. The method according to claim 3, wherein the set of control resource sets comprises the second number, N, of control resource sets from a plurality of control resource sets configured in an active downlink bandwidth part of a serving cell.

5. The method according to claim 4, wherein transmitting the plurality of uplink channel repetitions comprises transmitting the plurality of uplink channel repetitions on the serving cell.

6. The method according to claim 4,
  wherein the serving cell is a first serving cell,
  wherein transmitting the plurality of uplink channel repetitions comprises transmitting the plurality of uplink channel repetitions on a second serving cell different from the first serving cell, and
  wherein the first serving cell is a scheduling cell and the second serving cell is a scheduled cell.

7. The method according to claim 4, wherein the second number, N, of control resource sets comprise the second number, N, of control resource sets with the second number, N, of lowest control resource set identities from the plurality of control resource sets.

8. The method according to claim 4, further comprising receiving configuration of a plurality of control resource set pools,
wherein each of the second number, N, of control resource sets corresponds to a control resource set with a lowest control resource set identity in each of the second number, N, of control resource set pools of the plurality of control resource set pools.

9. The method according to claim 1, wherein the plurality of quasi-co-location assumptions associated with the downlink reception comprise a plurality of quasi-co-location assumptions of a plurality of transmission configuration indicator states configured in an active downlink bandwidth part of a serving cell.

10. The method according to claim 9, wherein the plurality of transmission configuration indicator states further comprises the second number, N, of activated transmission configuration indicator states associated with reception of a physical downlink shared channel in the active downlink bandwidth part of the serving cell.

11. The method according to claim 9, wherein the plurality of transmission configuration indicator states further comprises the second number, N, of activated transmission configuration indicator states associated with transmission of a physical uplink channel.

12. The method according to claim 1, further comprising receiving scheduling information of the uplink channel, wherein the number of repetitions is determined based on the scheduling information.

13. The method according to claim 12, wherein the number of spatial relations is determined based on the scheduling information.

14. The method according to claim 1, wherein at least one spatial relation of the plurality of spatial relations is predetermined.

15. A user equipment (UE) for wireless communication, comprising:
at least one memory; and
at least one processor coupled with the at least one memory and configured to cause the UE to:
determine a number of repetitions equal to a first number, K, and a number of spatial relations equal to a second number, N, to transmit an uplink channel with a plurality of uplink channel repetitions and with a plurality of spatial relations,
where a total number of the plurality of uplink channel repetitions comprise the first number, K, of repetitions and a total number of the plurality of spatial relations comprise the second number, N, of spatial relations, and
determine the plurality of spatial relations for transmission of the plurality of uplink channel repetitions based on a plurality of quasi-co-location assumptions associated with downlink reception; and
transmit the plurality of uplink channel repetitions based on the determined plurality of spatial relations.

16. The UE according to claim 15, wherein the at least one processor is further configured to cause the UE to receive an indication to use one or more default beams for transmission of the uplink channel, where the determined plurality of spatial relations comprise determined beams of the one or more default beams.

17. The UE according to claim 15, wherein the plurality of quasi-co-location assumptions associated with the downlink reception comprise a plurality of quasi-co-location assumptions associated with a set of control resource sets.

18. The UE according to claim 15, wherein the plurality of quasi-co-location assumptions associated with the downlink reception comprise a plurality of quasi-co-location assumptions of a plurality of transmission configuration indicator states configured in an active downlink bandwidth part of a serving cell.

19. The UE according to claim 15, wherein at least one spatial relation of the plurality of spatial relations is predetermined.

20. A processor for wireless communication, comprising:
at least one controller coupled with at least one memory and configured to cause the processor to:
determine a number of repetitions equal to a first number, K, and a number of spatial relations equal to a second number, N, to transmit an uplink channel with a plurality of uplink channel repetitions and with a plurality of spatial relations,
where a total number of the plurality of uplink channel repetitions comprise the first number, K, of repetitions and a total number of the plurality of spatial relations comprise the second number, N, of spatial relations, and
determine the plurality of spatial relations for transmission of the plurality of uplink channel repetitions based on a plurality of quasi-co-location assumptions associated with downlink reception; and
transmit the plurality of uplink channel repetitions based on the determined plurality of spatial relations.

* * * * *